United States Patent
Gordon et al.

[15] 3,702,601
[45] Nov. 14, 1972

[54] ELECTRONIC FUEL INJECTION SYSTEM

[72] Inventors: Colin C. Gordon, Cincinnati, Ohio; John P. McGavic, Kokomo, Ind.

[73] Assignee: General Motors Corporation, Detroit, Mich.

[22] Filed: June 11, 1971

[21] Appl. No.: 152,088

[52] U.S. Cl.............................123/32 EA, 123/119 R
[51] Int. Cl..............................................F02m 51/00
[58] Field of Search....123/32, 32 EA, 32 AE, 134 E, 123/119 R

[56] References Cited

UNITED STATES PATENTS 3,522,794   8/1970   Reichardt..............123/32 EA

*Primary Examiner*—Laurence M. Goodridge
*Attorney*—E. W. Christen, C. R. Meland and Tim G. Jagodzinski

[57] ABSTRACT

An internal combustion engine includes a group of eight fuel injectors for applying fuel to the engine. A set of four timing signals developed in synchronization with engine operation collectively contain eight magnitude permutations per engine cycle. The occurrence of each of the magnitude permutations defines the start of injection for a corresponding one of the fuel injectors. The set of timing signals is combined to form a pair of timing signals which are combined to form a single timing signal containing all of the magnitude permutations. A single pulse train developed in synchronization with the single timing signal contain eight control pulses per engine cycle. The length of each of the control pulses defines the period of injection for a corresponding one of the fuel injectors in time compressed nonoverlapping relationship. The single pulse train is separated by the single timing signal to form a pair of pulse trains which are separated by the pair of timing signals to form a set of four pulse trains collectively containing all of the control pulses. The length of the control pulses in the set of pulse trains is extended to define the period of injection for the fuel injectors in time expanded overlapping relationship. Lastly, the set of pulse trains is separated by the set of timing signals to form a series of eight pulse trains each containing control pulses which are applied to energize a corresponding one of the group of eight fuel injectors.

6 Claims, 7 Drawing Figures

PATENTED NOV 14 1972                      3,702,601

INVENTORS.
Colin C. Gordon &
BY John P. McGavic

*[signature]*
ATTORNEY

INVENTORS
Colin C. Gordon &
John P. McGavic
BY
Sira G. Jagodzinski
ATTORNEY

ELECTRONIC FUEL INJECTION SYSTEM

This invention relates to an electronic fuel injection system for an internal combustion engine. More particularly, the invention relates to an electronic fuel injection system including eight fuel injectors for successively applying fuel to an engine in overlapping time relationship during each engine cycle.

According to the invention, an internal combustion engine includes a group of eight fuel injectors for applying fuel to the engine when individually energized in a given injection order once during each engine cycle. A set of four timing signals is developed in synchronization with engine operation. The set of timing signals collectively contain eight magnitude permutations per engine cycle. The occurrence of each of the magnitude permutations defines the start of injection for a corresponding one of the fuel injectors based upon the injection order. Specifically, each of the set of timing signals contains two magnitude permutations per engine cycle. The set of four timing signals is multiplexed to form a pair of timing signals each containing four magnitude permutations per engine cycle. In turn, the pair of timing signals is multiplexed to form a single timing signal containing all eight magnitude permutations per engine cycle.

A single pulse train is developed in synchronization with the single timing signal. The single pulse train contains eight control pulses per engine cycle in response to the eight magnitude permutations per engine cycle in the single timing signal. The length of each of the control pulses defines the period of injection for a corresponding one of the fuel injectors based upon the injection order. Therefore, in order to exercise control over the operation of the engine, the precise length of each of the control pulses is determined as a function of at least one engine operating parameter. However, since all of the control pulses are confined within one pulse train, the control pulses cannot overlap one another. As a result, the actual length of the control pulses is less than the desired period of injection by a predetermined factor. The single pulse train is separated by the single timing signal to form a pair of pulse trains each containing four control pulses per engine cycle. In turn, the pair of pulse trains is separated by the pair of timing signals to form a set of four pulse trains each containing two control pulses per engine cycle.

Since the control pulses are now dispersed among four pulse trains, the control pulses may now overlap one another. Consequently, at this point, the length of the control pulses in the set of pulse trains is expanded by the predetermined factor so that the length of the control pulses conforms with the desired period of injection for the fuel injectors. As a result, the control pulses are presented in overlapping relationship. This overlapping relationship is necessary for engines which require the injection of more fuel per engine cycle than is possible when the control pulses are presented in nonoverlapping relationship. After extension of the control pulses, the set of four pulse trains is separated by the set of four timing signals to form a series of eight pulse trains each containing one control pulse per engine cycle. The first through eighth of the series of pulse trains are applied to the first through eighth of the group of fuel injectors in the injection order to individually energize the fuel injectors over the length of the control pulses in the pulse trains.

These and other aspects and advantages of the invention will become more apparent by reference to the following detailed description of a preferred embodiment when considered in conjunction with the accompanying drawings.

Figure 1:
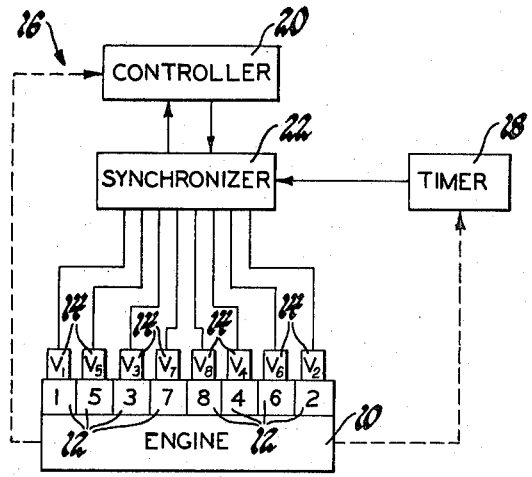
FIG. 1 is a block diagram of an electronic fuel injection system incorporating the principles of the invention.

Referring to FIG. 1, an internal combustion engine 10 includes a group of eight cylinders 12 numbered 1 through 8. Preferably, the engine 10 is a V-8 having a first bank of cylinders 1-3-5-7 and a second bank of cylinders 2-4-6-8. An ignition system (not shown), which conventionally includes a spark coil, a spark distributor and spark plugs, defines the firing order of the cylinders 12 during each engine cycle. For the sake of convenience, it is assumed that the firing order of the cylinders 12 is 1-2-3-4-5-6-7-8 per engine cycle. A group of eight fuel injectors 14 identified $V_1$ through $V_8$ are mounted on the engine 10 for individually applying fuel to corresponding ones of the eight cylinders 12 once during each engine cycle. The fuel injectors 14 may be mounted for direct communication with the cylinders 12 or for indirect communication with the cylinders 12 through the intake manifold (not shown). In synchronization with the firing order of the cylinders 12 per engine cycle, the injection order of the fuel injectors 14 is $V_1$-$V_2$-$V_3$-$V_4$-$V_5$-$V_6$-$V_7$-$V_8$ per engine cycle. A fuel supply system (not shown) which conventionally includes a fuel tank, a fuel pump and a pressure regulator, is connected to the fuel injectors 14 for providing fuel at a constant pressure. The fuel injectors $V_1$-$V_8$ are successively energized in the injection order during each engine cycle by an electronic fuel injection control system 16 to individually apply fuel to the cylinders 1-8 in overlapping time relationship.

The electronic fuel injection control system 16 includes a timer 18, a controller 20 and a synchronizer 22. The timer 18 is connected between the engine 10 and the synchronizer 22 for providing timing information defining the start of injection for each of the fuel injectors 14 per engine cycle. The controller 20 is connected between the engine 10 and the synchronizer 22 for providing control information defining the period of injection for each of the fuel injectors 14 per engine cycle. The synchronizer 22 is connected with each of the fuel injectors 14 for energizing the fuel injectors 14 at time instants determined by the timer 18 and for time durations determined by the controller 20. More particularly, the synchronizer 22 successively energizes the fuel injectors $V_1$-$V_8$ in the injection order with control pulses each starting at a time instant defined by timing information received from the timer 18 and each having a time duration defined by control information received from the controller 20. The fuel injectors $V_1$-$V_8$ are each responsive to the application of a control pulse to inject fuel to a corresponding one of cylinders 1-8 at a constant rate for the duration of the control pulse.

Figure 2:
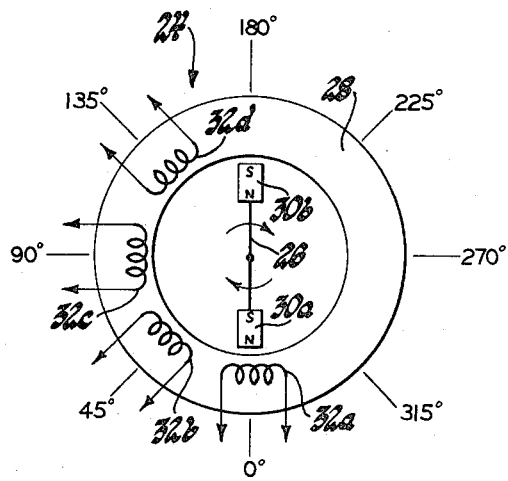
FIG. 2 is a schematic diagram of a pick-up transducer utilized by the invention.

Referring to FIG. 2, the timer 18 is preferably provided by an electromagnetic pick-up transducer 24 including a rotor 26 and a stator 28. The rotor 26 is supported at a centerpoint for 360° rotation in a clockwise direction with respect to the stator 28. A pair of permanent magnets $30_a$ and $30_b$ are mounted on opposite ends of the rotor 26. A group of four windings $32_a$, $32_b$, $32_c$ and $32_d$ are mounted on the stator 28. The permanent magnets $30_a$ and $30_b$ are oppositely poled with respect to the windings $32_a$-$32_d$. That is, the permanent magnet $30_a$ presents a north pole to the windings $32_a$-$32$ while the permanent magnet $30_b$ presents a south pole to the windings $32_a$-$32_d$.

In operation, the rotor 26 is driven relative to the stator 28 in synchronization with the operation of the engine 10 so that the rotor 26 makes one complete revolution per engine cycle. Hence, the angle markings to the outside of the stator 28 indicate successive 45° increments in both the position of the rotor 26 and the cycle of the engine 10. The windings $32_a$-$32_d$ are located at peripheral points on the stator 24 successively spaced at angles of 45° with respect to the center point of the rotor 26. Specifically, the winding $32_a$ is located at the 0° point, the winding $32_b$ is located at the 45° point, the winding $32_c$ is located at the 90° point and the winding $32_d$ is located at the 135° point. As the rotor 26 is turned relative to the stator 28, the permanent magnets $30_a$ and $30_b$ are alternately carried into and out of electromagnetic coupling relationship with the windings $32_a$-$32_d$ so as to produce a corresponding set of four input signals $W_1$-$W_4$ as shown in FIG. 3.

Figure 3:
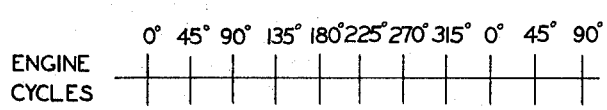
FIG. 3 is a graphic diagram of several waveforms useful in explaining the operation of the pick-up transducer.
Figure 3:
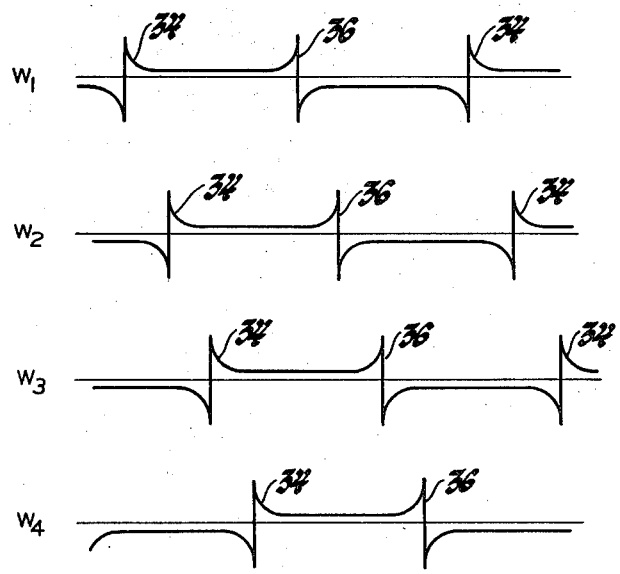

Referring to FIGS. 2 and 3, the input signals $W_1$-$W_4$ each include alternate first and second pulse pairs 34 and 36. The first pulse pairs 34 are developed in the input signals $W_1$-$W_4$ as the permanent magnet $30_a$ successively sweeps past the windings $32_a$-$32_d$, respectively. Alternately, the second pulse pairs 36 are developed in the input signals $W_1$-$W_4$ as the permanent magnet $30_b$ successively sweeps past the windings $32_a$-$32_d$. The first pulse pairs 34 each exhibit a sharp negative-to-positive polarity transition while the second pulse pairs 36 each exhibit a sharp positive-to-negative polarity transition. The negative-to-positive polarity transitions in the first pulse pairs 34 of the input signals $W_1$-$W_4$ successively occur at the 0° point, the 45° point, the 90° point and the 135° point in each engine cycle, respectively, as the centerline of the permanent magnet $30_a$ successively aligns with the centerlines of the windings $32_a$-$32_d$, respectively. Similarly, the positive-to-negative polarity transitions in the second pulse pairs 36 of the input signals $W_1$-$W_4$ successively occur at the 180° point, the 220° point, the 270° point and the 315° point in each engine cycle, respectively, as the centerline of the permanent magnet $30_b$ successively aligns with the centerlines of the windings $32_a$-$32_d$, respectively.

For demonstration purposes, it is assumed that each 360° engine cycle is coextensive with the injection order of the fuel injectors $V_1$-$V_8$. That is, the beginning or 0° point of each engine cycle coincides with the start of injection for the first fuel injector $V_1$ in the injection order. Accordingly, the negative-to-positive polarity transitions in the first pulse pairs 34 of the input signals $W_1$-$W_4$ define the start of injection for the fuel injectors $V_1$-$V_4$ in the first half of the injection order, respectively. Conversely, the positive-to-negative polarity transitions in the second pulse pairs 36 of the input signals $W_1$-$W_4$ define the start of injection for the fuel injectors $V_5$-$V_8$ in the second half of the injection order, respectively.

A more detailed description of the illustrated pick-up transducer 24 may be obtained by reference to U.S. Pat. application, Ser. No. 36,055. However, it is to be noted that various alterations and modifications may be made to the pick-up transducer 24 without affecting the invention. For example, the windings $32_a$-$32_d$ may be replaced by Hall effect resistors or any other suitable electromagnetic signal generating devices. Further, the electromagnetic transducer 24 may be entirely replaced by a multiple contact relay switch, a photoelectric transducer or some other equivalent arrangement.

Before proceeding to a detailed description of the synchronizer 22, an introduction to the logic concepts employed within the synchronizer 22 is in order. Specifically, the synchronizer 22 comprises logic components including inverters, flip-flops, AND gates, OR gates and multipliers for manipulating logic signals including square waves and pulse trains. The bilevel logic signals utilized by the synchronizer 22 periodically shift between high and low levels. More particularly, the logic signals exhibit alternate high-to-low level transitions and low-to-high level transitions. As used herein, the high levels of the logic signals represent a logic 1 or true state while the low levels of the logic signals represent a logic 0 or false state. However, it is to be noted that the 1 and 0 designations of the high and low levels are purely arbitrary and may be reversed without affecting the logical relationships between the logic signals.

Figure 4:
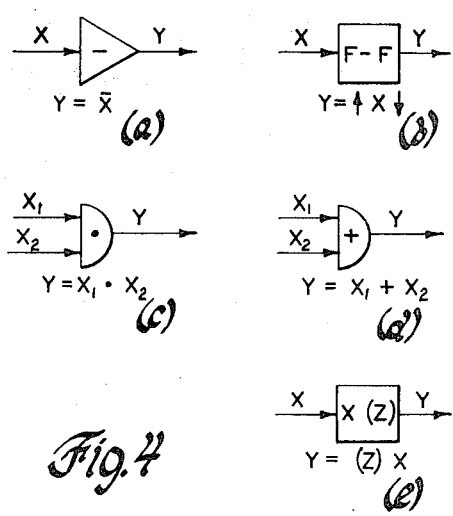
FIG. 4 is a schematic diagram of several logic devices utilized by the invention.

As used herein, an inverter is a logic device for providing an output which represents the inverse of an input. If the input is X and the output is Y, the logical function of an inverter may be expressed by the following equation:

$$Y = \bar{X} \qquad (1)$$

where the (−) above the X indicates the inverse of X. The symbol which will be used to designate an inverter is shown in FIG. 4a. The inverters employed within the synchronizer 22 may be provided by any of the various suitable inverter devices well known in the art.

As used herein, a flip-flop is a logic device for providing an output which shifts to a high level and remains there in response to a low-to-high level transition in an input and which shifts to a low level and remains there in response to a high-to-low level transition in the input. If the input is X and the output is Y, the logical function of a flip-flop may be represented by the following equation:

$$Y = \uparrow X \downarrow \quad (2)$$

where the ($\uparrow$) indicates a low-to-high level transition in the input X and the ($\downarrow$) indicates a high-to-low level transition in the input X. The symbol which will be used to designate a flip-flop is shown in FIG. 4b. The flip-flops employed within the synchronizer 22 may be provided by any of the various suitable flip-flop or bistable devices well known in the art.

As used herein, an AND gate is a logic device for providing an output which is the logical AND function of at least two inputs. If the inputs are $X_1$ and $X_2$ and the output is Y, the logical function of an AND gate may be expressed by the following equation:

$$Y = X_1 \cdot X_2 \quad (3)$$

where the ($\cdot$) indicates the logical AND function. The symbol which will be used to denote an AND gate is shown in FIG. 4c. The AND gates employed within the synchronizer 22 may be provided by any of the various suitable AND gate devices well known in the art.

As used herein, an OR gate is a logic device for providing an output which is the logical OR function of at least two inputs. If the inputs are $X_1$ and $X_2$ and the output is Y, the logical function of an OR gate may be expressed by the following equation:

$$Y = X_1 + X_2 \quad (4)$$

where the (+) indicates the logical OR relationship. The symbol which will be used to designate an OR gate is shown in FIG. 4d. The OR gates employed within the synchronizer 22 may be provided by any of the various suitable OR gate devices well known in the art.

As used herein, a multiplier is a logic device for providing an output which extends or multiplies the time period during which an input is in a particular logic condition by a predetermined factor. If the input is X and the output is Y and the predetermined factor is Z, the logical function of a multiplier may be expressed by the following equation:

$$Y = (Z)X \quad (5)$$

The symbol which will be used to designate a multiplier is shown in FIG. 4e. The multipliers employed within the synchronizer 22 may be provided by any of the various suitable multiplier devices well known in the art.

Figure 5:
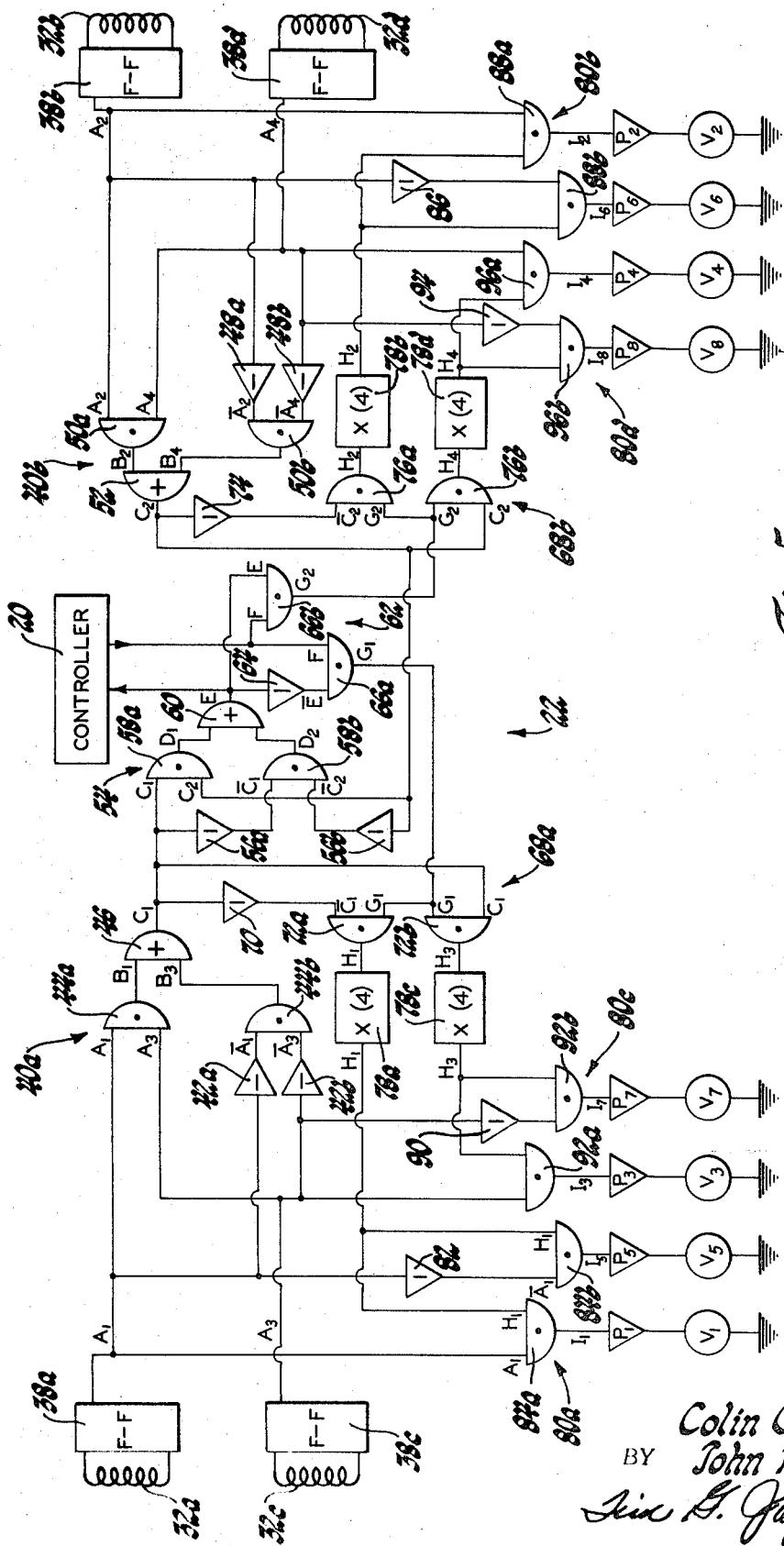
FIG. 5 is a schematic diagram of an electronic fuel injection system incorporating the principles of the invention.
Figure 6:
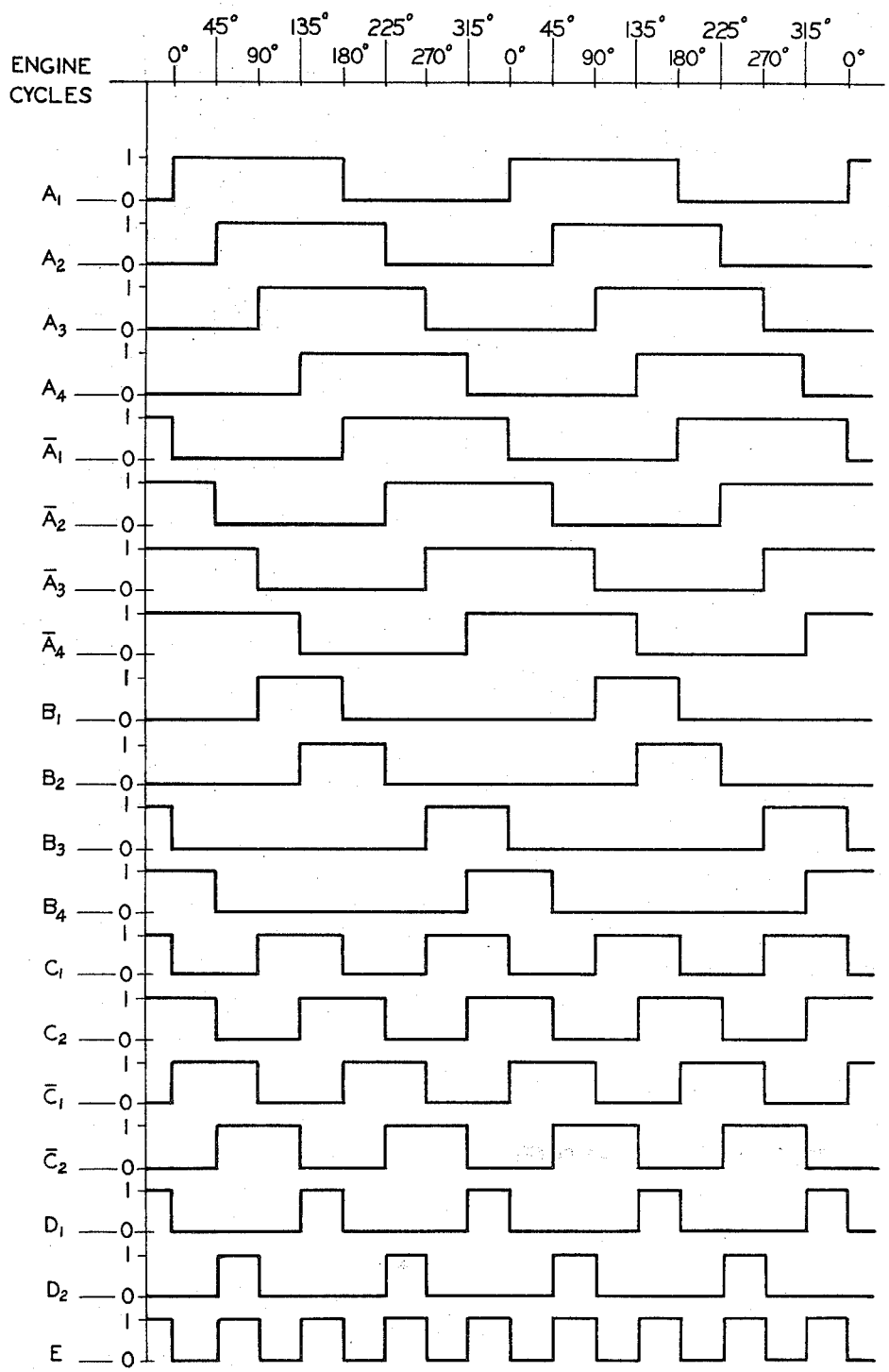
FIGS. 6 and 7 are graphic diagrams of several waveforms useful in explaining the principles of the invention.

Referring to FIGS. 5 and 6, the group of input windings $32_a$–$32_d$ of the pick-up transducer 24 are connected to corresponding ones of a group of four bistable multivibrators or flip-flops $38_a$–$38_d$, respectively. The flip-flops $38_a$–$38_d$ are responsive to the input signals $W_1$–$W_4$ to provide a corresponding set of four symmetrical timing signals $A_1$–$A_4$, respectively. The timing signals $A_1$–$A_4$ are square waves exhibiting periodic magnitude permutations or amplitude transitions between a high level and a low level. The timing signals $A_1$–$A_4$ may be expressed by the following equations:

$$A_1 = \uparrow W_1 \downarrow \quad (6)$$

$$A_2 = \uparrow W_2 \downarrow \quad (7)$$

$$A_3 = \uparrow W_3 \downarrow \quad (8)$$

$$A_4 = \uparrow W_4 \downarrow \quad (9)$$

Thus, the timing signals $A_1$–$A_4$ shift to the high level in response to the occurrence of the negative-to-positive polarity transitions in the first pulse pairs 34 of the input signals $W_1$–$W_4$, respectively. Alternately, the timing signals $A_1$–$A_4$ shift to the low level in response to the occurrence of the positive-to-negative polarity transitions in the second pulse pairs 36 of the input signals $W_1$–$W_4$, respectively. As a result, the timing signals $A_1$–$A_4$ each contain two level transitions per engine cycle.

More particularly, in the timing signal $A_1$, a low-to-high level transition occurs at the 0° point and a high-to-low level transition occurs at the 180° point in each engine cycle marking the start of injection for the fuel injectors $V_1$ and $V_5$, respectively. In the timing signal $A_2$, a low-to-high level transition occurs at the 45° point and a high-to-low level transition occurs at the 225° point in each engine cycle marking the start of injection for the fuel injectors $V_2$ and $V_6$, respectively. In the timing signal $A_3$, a low-to-high level transition occurs at the 90° point and a high-to-low level transition occurs at the 270° point marking the start of injection for the fuel injectors $V_3$ and $V_7$, respectively. In the timing signal $A_4$, a low-to-high level transition occurs at the 135° point and a high-to-low level transition occurs at the 315° point in each engine cycle marking the start of injection for the fuel injectors $V_4$ and $V_8$, respectively. Accordingly, the magnitude permutations or amplitude transitions in the set of timing signals $A_1$–$A_4$ are successively spaced at intervals of 180° or one-half of an engine cycle within each of the timing signals $A_1$–$A_4$ and are successively displaced at intervals of 45° or one-eighth of an engine cycle between each of the timing signals $A_1$–$A_4$.

A pair of multiplexers $40_a$ and $40_b$ are connected with the flip-flops $38_a$–$38_d$. Specifically, the multiplexer $40_a$ is connected to the flip-flops $38_a$ and $38_c$ for receiving the timing signals $A_1$ and $A_3$. The multiplexer $40_a$ includes two inverters $42_a$ and $42_b$, two AND gates $44_a$ and $44_b$, and one OR gate 46 interconnected as shown. The inverters $42_a$ and $42_b$ are responsive to the timing signals $A_1$ and $A_3$ to provide timing signals $\overline{A}_1$ and $\overline{A}_3$ equal to the inverse of the timing signals $A_1$ and $A_3$, respectively. The AND gate $44_a$ is responsive to the timing signals $A_1$ and $A_3$ to provide a timing signal $B_1$ equal to the AND function of the timing signals $A_1$ and $A_3$. Similarly, the AND gate $44_b$ is responsive to the timing signals $\overline{A}_1$ and $\overline{A}_3$ to provide a timing signal $B_3$ equal to the AND function of the timing signals $\overline{A}_1$ and $\overline{A}_3$. The OR gate 46 is responsive to the timing signals $B_1$ and $B_3$ to provide a timing signal $C_1$ equal to the OR function of the timing signals $B_1$ and $B_3$. The timing signal $C_1$ may be expressed by the following equation:

$$C_1 = (A_1 \cdot A_3) + (\overline{A}_1 \cdot \overline{A}_3) \quad (10)$$

Thus, the multiplexer $40_a$ provides a timing signal $C_1$ equal to the OR function of the AND function of the timing signals $A_1$ and $A_3$ and the AND function of the inverse of the timing signals $A_1$ and $A_3$.

The multiplexer $40_b$ is connected to the flip-flops $38_b$ and $38_d$ for receiving the timing signals $A_2$ and $A_4$. The multiplexer $40_b$ includes two inverters $48_a$ and $48_b$, two AND gates $50_a$ and $50_b$, and one OR gate 52 interconnected as shown. The inverters $48_a$ and $48_b$ are responsive to the timing signals $A_2$ and $A_4$ to provide timing signals $\overline{A}_2$ and $\overline{A}_4$ equal to the inverse of the timing signals $A_2$ and $A_4$, respectively. The AND gate $50_a$ is responsive to the timing signals $A_2$ and $A_4$ to provide a timing signal $B_2$ equal to the AND function of the timing signals $A_2$ and $A_4$. Likewise, the AND gate $50_b$ is responsive to the timing signals $\overline{A_2}$ and $\overline{A_4}$ to provide a timing signal $B_4$ equal to the AND function of the timing signals $\overline{A_2}$ and $\overline{A_4}$. The OR gate 52 is responsive to the timing signals $B_2$ and $B_4$ to provide a timing signal $C_2$ equal to the OR function of the timing signals $B_2$ and $B_4$. The timing signal $C_2$ may be expressed by the following equation:

$$C_2 = (A_2 \cdot A_4) + (\overline{A_2} \cdot \overline{A_4}) \qquad (11)$$

Hence, the multiplexer $40_b$ provides a timing signal $C_2$ equal to the OR function of the AND function of the timing signals $A_2$ and $A_4$ and the AND function of the inverse of the timing signals $A_2$ and $A_4$.

Collectively, the multiplexers $40_a$ and $40_b$ are responsive to the set of four timing signals $A_1$–$A_4$ to provide a pair of timing signals $C_1$ and $C_2$. The timing signals $C_1$ and $C_2$ are square waves exhibiting periodic magnitude permutations or amplitude transitions between a high level and a low level. In particular, the timing signal $C_1$ shifts to the low level in response to each of the level transitions in the timing signal $A_1$ and shifts to the high level in response to each of the level transitions in the timing signal $A_3$. Similarly, the timing signal $C_2$ shifts to the low level in response to each of the level transitions in the timing signal $A_2$ and shifts to the high level in response to each of the level transitions in the timing signal $A_4$. Consequently, the magnitude permutations or amplitude transitions in the pair of timing signals $C_1$ and $C_2$ are successively spaced at intervals of 90° or one-quarter of an engine cycle within each of the timing signals $C_1$ and $C_2$ and are successively displaced at intervals of 45° or one-eighth of an engine cycle between each of the timing signals $C_1$ and $C_2$. Thus, during each engine cycle, the timing signal $C_1$ contains four level transitions successively identifying the fuel injectors $V_1$, $V_3$, $V_5$ and $V_7$. Alternately, during each engine cycle, the timing signal $C_2$ contains four level transitions successively identifying the fuel injectors $V_2$, $V_4$, $V_6$ and $V_8$.

A single multiplexer 54 is connected to each of the multiplexers $40_a$ and $40_b$ for receiving the timing signals $C_1$ and $C_2$. The multiplexer 54 includes two inverters $56_a$ and $56_b$, two AND gates $58_a$ and $58_b$ and one OR gate 60 interconnected as shown. The inverters $56_a$ and $56_b$ are responsive to the timing signals $C_1$ and $C_2$ to provide timing signals $\overline{C_1}$ and $\overline{C_2}$ equal to the inverse of the timing signals $C_1$ and $C_2$. The AND gate $58_a$ is responsive to the timing signals $C_1$ and $C_2$ to provide a timing signal $D_1$ equal to the AND function of the timing signals $C_1$ and $C_2$. Similarly, the AND gate $58_a$ is responsive to the timing signals $\overline{C_1}$ and $\overline{C_2}$ to provide a timing signal $D_2$ equal to the AND function of the timing signals $C_1$ and $C_2$. The OR gate 60 is responsive to the timing signals $D_1$ and $D_2$ to provide a single timing signal E equal to the OR function of the timing signals $D_1$ and $D_2$. The timing signal E may be expressed by the following equation:

$$E = (C_1 \cdot C_2) + (\overline{C_1} \cdot \overline{C_2}) \qquad (12)$$

Thus, the multiplexer 54 provides a single timing signal E equal to the OR function of the AND function of the timing signals $C_1$ and $C_2$ and the AND function of the inverse of the timing signals $C_1$ and $C_2$.

The timing signal E exhibits periodic magnitude permutations or amplitude transitions between a high level and a low level. Specifically, the timing signal E shifts to the low level in response to each of the level transitions in the timing signal $C_1$ and shifts to the high level in response to each of the level transitions in the timing signal $C_2$. Accordingly, the magnitude permutations or amplitude transitions in the single timing signal E are successively spaced at intervals of 45° or one-eighth of an engine cycle. Hence, during each engine cycle, the timing signal E contains eight level transitions successively defining the start of injection for the fuel injectors $V_1$–$V_8$.

Figure 7:
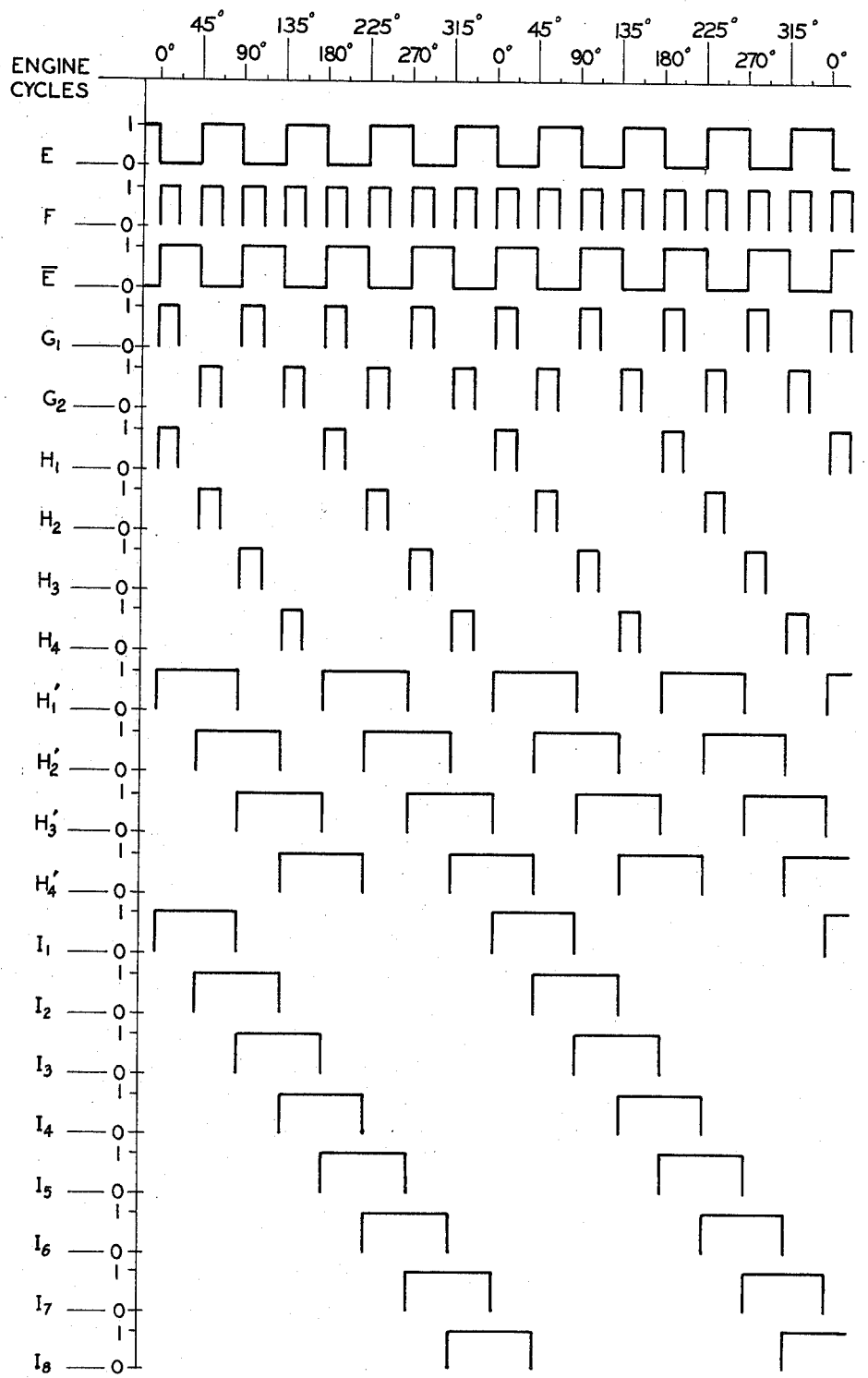

Referring to FIGS. 5, 6 and 7, the controller 20 is responsive to the single timing signal E to provide a single pulse train F containing eight bilevel control pulses per engine cycle synchronized with the eight level transitions per engine cycle in the single timing signal E. That is, the control pulses in the single pulse train F are each initiated in response to the occurrence of a corresponding one of the level transitions in the single timing signal E. As previously described, the occurrence of each of the eight level transitions in the timing signal F defines the start of injection for a corresponding one of the eight fuel injectors $V_1$–$V_8$ according to the injection order during each engine cycle. Likewise, the duration of each of the eight control pulses defines the period of injection for a corresponding one of the fuel injectors $V_1$–$V_8$ according to the injection order during each engine cycle. More specifically, the controller 20 determines the duration of each of the control pulses in the single pulse train F as a function of at least one operating parameter of the engine 10, such as manifold pressure or throttle position. Since the controller 20 is only incidental to the present invention, it is not described in detail. For a detailed description of one embodiment of the controller 20, reference may be made to U.S. Pat. application, Ser. No. 36,055.

In order to achieve satisfactory performance in most V–8 engines such as the engine 10, it is necessary that the period of injection for the fuel injectors $V_1$–$V_8$ approach a maximum duration of 180° or one-half of an engine cycle at relatively high speeds and relatively high loads. In other words, the individual injection periods of the fuel injectors $V_1$–$V_8$ must overlap one another. However, the control pulses in the single pulse train E cannot overlap one another. The maximum time available between successive level transitions in the single timing signal E is 45° or one-eighth of an engine cycle. Consequently, the controller 20 determines the duration of the control pulses in the single pulse train as a fraction or a percentage of the maximum time available between successive level transitions in the single timing signal E. As a result, the duration of the control pulses in the single pulse signal F is less than the desired period of injection for the fuel injectors $V_1$–$V_8$ by a factor of four (4). Later on, the duration of the control pulses will be expanded by a factor of four (4) to conform the actual duration of the control pulses with the desired period of injection for the fuel injectors $V_1$–$V_8$.

A single separator 62 is connected to the controller 20 for receiving the single pulse train F and is connected to the multiplexer 54 for receiving the single timing signal E. The separator 62 includes an inverter 64 and two AND gates $66_a$ and $66_b$ interconnected as shown. The inverter 64 is responsive to the timing signal E to provide a timing signal $\overline{E}$ equal to the inverse of the timing signal E. The AND gate $66_a$ is responsive to the single pulse train F and the single timing signal $\overline{E}$ to provide a pulse train $G_1$ equal to the AND function of the pulse train F and the timing signal $\overline{E}$. The AND gate $66_b$ is responsive to the single pulse train F and the single timing signal E to provide a pulse train $G_2$ equal to the AND function of the pulse train F and the timing signal E. The pulse trains $G_1$ and $G_2$ may be expressed by the following equations:

$$G_1 = F \cdot \overline{E} \qquad (13)$$

$$G_2 = F \cdot E \qquad (14)$$

Hence, the separator 62 provides a pair of pulse trains $G_1$ and $G_2$ equal to the individual AND functions of the single pulse train F with the inverse of the single timing signal E and with the single timing signal E, respectively.

More particularly, the pulse train $G_1$ contains control pulses from the pulse train F which are initiated in coincidence with high-to-low level transitions in the timing signal E. Alternately, the pulse train $G_2$ contains control pulses from the pulse train F which are initiated in coincidence with low-to-high level transitions in the timing signal E. As a result, the control pulses in the pair of pulse trains $G_1$ and $G_2$ are successively initiated at intervals of 90° or one-quarter of an engine cycle within each of the pulse trains $G_1$ and $G_2$. Hence, during each engine cycle, the pulse train $G_1$ contains four control pulses successively identified with the fuel injectors $V_1$, $V_3$, $V_5$ and $V_7$. Conversely, during each engine operating cycle, the pulse train $G_2$ contains four control pulses successively identified with the fuel injectors $V_2$, $V_4$, $V_6$ and $V_8$.

A pair of separators $68_a$ and $68_b$ are connected to the single separator 62 and are connected to the pair of the multiplexers $40_a$ and $40_b$, respectively. Specifically, the separator $68_a$ is connected to the separator 62 for receiving the pulse train $G_1$ and is connected to the multiplexer $40_a$ for receiving the timing signal $C_1$. The separator $68_a$ includes an inverter 70 and two AND gates $72_a$ and $72_b$ interconnected as shown. The inverter 70 is responsive to the timing signal $C_1$ to provide a timing signal $\overline{C_1}$ equal to the inverse of the timing signal $C_1$. The AND gate $72_a$ is responsive to the pulse train $G_1$ and to the timing signal $\overline{C_1}$ to provide a pulse train $H_1$ equal to the AND function of the pulse train $G_1$ and the timing signal $\overline{C_1}$. Similarly, the AND gate $72_b$ is responsive to the pulse $G_1$ and to the timing signal $C_1$ to provide a pulse train $H_3$ equal to the AND function of the pulse train $G_1$ and the timing signal $C_1$. The pulse trains $H_1$ and $H_3$ may be expressed by the following equations:

$$H_1 = G_1 \cdot \overline{C_1} \qquad (15)$$

$$H_3 = G_1 \cdot C_1 \qquad (16)$$

Hence, the separator $68_a$ provides a pair of pulse trains $H_1$ and $H_3$ equal to the individual AND functions of the pulse train $G_1$ with the inverse of the timing signal $C_1$ and with the timing signal $C_1$, respectively. The pulse train $H_1$ contains control pulses from the pulse train $G_1$ which are initiated in coincidence with high-to-low level transitions in the timing signal $C_1$ while the pulse train $H_3$ contains control pulses from the pulse train $G_1$ which are initiated in coincidence with low-to-high level transitions in the timing signal $C_1$.

The separator $68_b$ is connected to the separator 62 for receiving the pulse train $G_2$ and is connected to the multiplexer $40_b$ for receiving the timing signal $C_2$. The separator $68_b$ includes an inverter 74 and two AND gates $76_a$ and $76_b$ interconnected as shown. The inverter 74 is responsive to the timing signal $C_2$ to provide a timing signal $\overline{C_2}$ equal to the inverse of the timing signal $C_2$. The AND gate $76_a$ is responsive to the pulse train $G_2$ and to the timing signal $\overline{C_2}$ to provide a pulse train $H_2$ equal to the AND function of the pulse train $G_2$ and the timing signal $\overline{C_2}$. Likewise, the AND gate $76_b$ is responsive to the pulse train $G_2$ and to the timing signal $C_2$ to provide a pulse train $H_4$ equal to the AND function of the pulse train $G_2$ and the timing signal $C_2$. The pulse trains $H_2$ and $H_4$ may be expressed by the following equations:

$$H_2 = G_2 \cdot \overline{C_2} \qquad (17)$$

$$H_4 = G_2 \cdot C_2 \qquad (18)$$

Hence, the separator $68_b$ provides a pair of pulse trains $H_2$ and $H_4$ equal to the individual AND functions of the pulse train $G_2$ with the inverse of the timing signal $C_2$ and with the timing signal $C_2$, respectively. The pulse train $H_2$ contains control pulses from the pulse train $G_2$ which are initiated in coincidence with high-to-low level transitions in the timing signal $C_2$ while the pulse train $H_4$ contains control pulses from the pulse train $G_2$ which are initiated in coincidence with low-to-high level transitions in the timing signal $C_2$.

Collectively, the pair of separators $68_a$ and $68_b$ are responsive to the pair of pulse trains $G_1$ and $G_2$ and to the pair of timing signals $C_1$ and $C_2$ to produce a set of four pulse trains $H_1$–$H_4$. The control pulses in the set of pulse trains $H_1$–$H_4$ are successively initiated at intervals of 180° or one-half of an engine cycle within each of the pulse trains $H_1$–$H_4$. As a result, each of the pulse trains $H_1$–$H_4$ contains two control pulses per engine cycle. The pulse train $H_1$ contains control pulses for the fuel injectors $V_1$ and $V_5$. The pulse train $H_2$ contains control pulses for the fuel injectors $V_2$ and $V_6$. The pulse train $H_3$ contains control pulses for the fuel injectors $V_3$ and $V_7$. The pulse train $H_4$ contains control pulses for the fuel injectors $V_4$ and $V_8$.

Since the control pulses in the set of pulse trains $H_1$–$H_4$ are initiated at intervals of 180° or one-half of an engine cycle, the duration of the control pulses may now be extended. A set of four multipliers $78_a$–$78_d$ is connected to the pair of separators $68_a$ and $68_b$ for receiving the set of pulse trains $H_1$–$H_4$. The multipliers $78_a$–$78$ are responsive to the set of pulse trains $H_1$–$H_4$ to extend the duration of the control pulses contained within the pulse trains $H_1$–$H_4$ by a factor of four (4) thereby to provide a corresponding set of four multiplied pulse trains $H'_1$–$H'_4$. As a result, the actual duration of the control pulses in the set of pulse trains $H'_1$–$H'_4$ conforms with the desired period of injection for the fuel injectors $V_1$–$V_8$ as determined by the controller 20 in response to operation of the engine 10. The set of pulse trains $H'_1$–$H'_4$ may be expressed by the following equations:

$$H'_1 = (4)H_1 \quad (19)$$

$$H'_2 = (4)H_2 \quad (20)$$

$$H'_3 = (4)H_3 \quad (21)$$

$$H'_4 = (4)H_4 \quad (22)$$

Due to the extension of the duration of the control pulses in the set of pulse trains $H_1$–$H_4$ by the multipliers $78_a$–$78_d$, the control pulses in the pulse trains $H'_1$–$H'_4$ may overlap one another. The total number of other control pulses overlapped by any one of the control pulses is dependent upon the duration of the control pulses in the pulse trains $H'_1$–$H'_4$. Further, since the multiplication factor is four (4), the maximum duration of the control pulses in the pulse trains $H'_1$–$H'_4$ approaches 180° or one-half of an engine cycle as the duration of the control pulses in the pulse train $H_1$–$H_4$ approaches 45° or one-eighth of an engine cycle. Hence, in the illustrated electronic fuel injection system, the maximum practical multiplication factor is four (4). However, it will be appreciated that the multiplication factor could be less than four (4) if desired.

A group of four separators $80_a$–$80_d$ are connected to the group of four multipliers $78_a$–$78_d$ and to the group of four flip-flops $38_a$–$38_d$, respectively. Specifically, the separator $80_a$ is connected to the multiplier $78_a$ for receiving the pulse train $H'_1$ and is connected to the flip-flop $38_a$ for receiving the timing signal $A_1$. The separator $80_a$ includes an inverter 82 and two AND gates $84_a$ and $84_b$. The inverter 82 is responsive to the timing signal $A_1$ to provide a timing signal $\overline{A_1}$ equal to the inverse to the timing signal $A_1$. The AND gate $84_a$ is responsive to the pulse train $H'_1$ and to the timing signal $A_1$ to provide a pulse train $I_1$ equal to the AND function of the pulse $H'_1$ and the timing signal $A_1$. Likewise, the AND gate $84_b$ is responsive to the pulse train $H'_1$ and to the timing signal $\overline{A_1}$ to provide a pulse train $I_5$ equal to the AND function of the pulse train $A_1$ and the timing signal $\overline{A_1}$. The pulse trains $I_1$ and $I_5$ may be expressed by the following equations:

$$I_1 = H'_1 \cdot A_1 \quad (23)$$

$$I_5 = H'_1 \cdot \overline{A_1} \quad (24)$$

Hence, the separator $80_a$ provides a pair of pulse trains $I_1$ and $I_5$ equal to the individual AND functions of the pulse train $H'_1$ with the timing signal $A_1$ and the inverse of the timing signal $A_1$, respectively. The pulse train $I_1$ contains control pulses from the pulse train $H'_1$ which are initiated in coincidence with low-to-high level transitions in the timing signal $A_1$ while the pulse train $I_5$ contains control pulses from the pulse train $H'_1$ which are initiated in coincidence with high-to-low level transitions in the timing signal $A_1$.

The separator $80_b$ is connected to the multiplier $78_b$ for receiving the pulse train $H'_2$ and is connected to the flip-flop $38_b$ for receiving the timing signal $A_2$. The separator $80_b$ includes an inverter 86 and two AND gates $88_a$ and $88_b$ interconnected as shown. The inverter 86 is responsive to the timing signal $A_2$ to provide a timing signal $\overline{A_2}$ equal to the inverse of the timing signal $A_2$. The AND gate 88 is responsive to the pulse train $H'_2$ and to the timing signal $A_2$ to provide a pulse train $I_2$ equal to the AND function of the pulse train $H'_2$ and the timing signal $A_2$. Similarly, the AND gate $88_b$ is responsive to the pulse train $H'_2$ and the timing signal $\overline{A_2}$ to provide a pulse train $I_6$ equal to the AND function of the pulse train $H'_2$ and the timing signal $\overline{A_2}$. The pulse trains $I_2$ and $I_6$ may be expressed by the following equations:

$$I_2 = H'_2 \cdot A_2 \quad (25)$$

$$I_6 = H'_2 \cdot \overline{A_2} \quad (26)$$

Thus, the separator $80_b$ provides a pair of pulse trains $I_2$ and $I_6$ equal to the individual AND functions of the pulse train $H'_2$ with the timing signal $A_2$ and the inverse of the timing signal $A_2$, respectively. The pulse train $I_2$ contains control pulses from the pulse train $H'_2$ which are initiated in coincidence with high-to-low level transitions in the timing signal $A_2$ while the pulse train $I_6$ contains control pulses from the pulse train $H'_2$ which are initiated in coincidence with low-to-high level transitions in the timing signal $A_2$.

The separator $80_c$ is connected to the multiplier $78_c$ for receiving the pulse train $H_3$ and is connected to the flip-flop $38_c$ for receiving the timing signal $A_3$. The separator $80_c$ includes an inverter 90 and two AND gates $92_a$ and $92_b$. The inverter 90 is responsive to the timing signal $A_3$ to provide a timing signal $\overline{A_3}$ equal to the inverse of the timing signal $A_3$. The AND gate $92_a$ is responsive to the pulse train $H'_3$ and to the timing signal $A_3$ to provide a pulse train $I_3$ equal to the AND function of the pulse train $H'_3$ and the timing signal $A_3$. Likewise, the AND gate $92_b$ is responsive to the pulse signal $H'_3$ and to the timing signal $\overline{A_3}$ to provide a pulse train $I_7$ equal to the AND function of the pulse train $H'_3$ and the timing signal $\overline{A_3}$. The pulse trains $I_5$ and $I_7$ may be expressed by the following equations:

$$I_3 = H'_3 \cdot A_3 \quad (27)$$

$$I_7 = H'_3 \cdot \overline{A_3} \quad (28)$$

Hence, the separator $80_c$ provides a pair of pulse trains $I_3$ and $I_7$ equal to the individual AND functions of the pulse train $H'_3$ with the timing signal $A_3$ and the inverse of the timing signal $A_3$, respectively. The pulse train $I_3$ contains control pulses from the pulse train $H'_3$ initiated in coincidence with low-to-high transitions in the timing signal $A_3$ while the pulse train $I_7$ contains control pulses from the pulse train $H'_3$ initiated in coincidence with high-to-low transitions in the timing signal $A_3$.

The separator $80_d$ is connected to the multiplier $78_d$ for receiving the pulse train $H'_4$ and is connected to the flip-flop $38_d$ for receiving the timing signal $A_4$. The separator $80_d$ includes an inverter 94 and two AND gates $96_a$ and $96_b$. The inverter 94 is responsive to the timing signal $A_4$ to provide a timing signal $\overline{A_4}$ equal to the inverse of the timing signal $A_4$. the AND gate $96_a$ is responsive to the pulse train $H'_4$ and the timing signal $A_4$ to provide a pulse train $I_4$ equal to the AND functions of the pulse train $H'_4$ and the timing signal $A_4$. The AND gate $96_b$ is responsive to the pulse train $H'_4$ and to the timing signal $\overline{A_4}$ to provide a pulse train $I_8$ equal to the AND function of the pulse train $H'_4$ and the timing signal $\overline{A_4}$. The pulse trains $I_4$ and $I_8$ may be expressed by the following equations:

$$I_4 = H'_4 \cdot A_4 \quad (29)$$

$$I_8 = H'_4 \cdot \overline{A_4} \quad (30)$$

Thus, the separator $96_d$ provides a pair of pulse trains $I_4$ and $I_8$ equal to the individual AND functions of the pulse train $H'_4$ with the timing signal $A_4$ and the inverse of the timing signal $A_4$, respectively. The pulse train $I_4$ contains control pulses from the pulse train $H'_4$ initiated in coincidence with low-to-high level transitions in the timing signal $A_4$ while the pulse train $I_8$ contains control pulses from the pulse train $H'_4$ initiated in response to high-to-low level transitions in the timing signal $A_4$.

Collectively, the group of separators $80_a$–$80_b$ are responsive to the set of pulse trains $H_1$–$H_4$ and to the set of timing signals $A_1$–$A_4$ to provide a series of eight pulse trains $I_1$–$I_8$. The pulse trains $I_1$–$I_8$ are equal to the individual AND functions of the pulse trains $H_1$–$H_4$ with the timing signals $A_1$–$A_4$ and with the inverse of the timing signals $A_1$–$A_4$, respectively. The control pulses in the series of pulse trains $I_1$–$I_8$ are successively initiated at intervals of 360° or one engine cycle within each of the pulse trains $I_1$–$I_8$ and are successively displaced at intervals of 45° or one-eighth of an engine cycle between each of the pulse trains $I_1$–$I_8$. Hence, the eight pulse trains $I_1$–$I_8$ each contain control pulses for a corresponding one of the eight fuel injectors $V_1$–$V_8$. Further, the control pulses in any one of the pulse trains $I_1$–$I_8$ may overlap the control pulses in a maximum of six other ones of the pulse trains $I_1$–$I_8$ dependent upon the duration of the control pulses.

A group of eight pulse amplifiers $P_1$–$P_8$ are connected between the group of separators $80_a$–$80_d$ and corresponding ones of the fuel injectors $V_1$–$V_8$ for amplifying the magnitude or level of the control pulses in corresponding ones of the pulse trains $I_1$–$I_8$. Further, the amplifiers $P_1$–$P_8$ apply the pulse trains $I_1$–$I_8$ to energize corresponding ones of the fuel injectors $V_1$–$V_8$ for the duration of the control pulses in the pulse trains $I_1$–$I_8$. Preferably, each of the fuel injectors $V_1$–$V_8$ is provided by an electromagnetic valve having a plunger which is driven to a fully open position against a spring bias when a solenoid is energized in response to the presence of a control pulse and which is driven to a fully closed position by the spring bias when the solenoid is deenergized in response to the absence of a control pulse. Thus, the fuel injectors $V_1$–$V_8$ are opened for the duration of the control pulses in the pulse trains $I_1$–$I_8$ to inject fuel at a constant rate to the cylinders 1–8 of the engine 10.

It will now be appreciated that the group of four flip-flops $38_a$–$38_b$ together with the pick-up transducer 24 are responsive to operation of the engine 10 to provide a set of four first order timing signals $A_1$–$A_4$. The pair of multiplexers $40_a$ and $40_b$ are responsive to the first order timing signals $A_1$–$A_4$ to provide a pair of second order timing signals $C_1$ and $C_2$. The single multiplexer 54 is responsive to the second order timing signals $C_1$ and $C_2$ to provide a single third order timing signal E. The controller 20 is responsive to the single third order timing signal E to provide a single fourth order pulse train F. The single separator 62 is responsive to the single pulse train F and to the single timing signal E to provide a pair of third order pulse trains $G_1$ and $G_2$. The pair of separators $68_a$ and $68_b$ are responsive to the pair of third order pulse trains $G_1$ and $G_2$ and to the pair of second order timing signals $C_1$ and $C_2$ to provide a set of four second order pulse trains $H_1$–$H_4$. The multipliers $78_a$–$78_d$ are responsive to the pulse trains $H_1$–$H_4$ to extend the duration of each of the control pulses in the second order pulse trains $H_1$–$H_4$ by a factor of four (4) to provide a set of four multiplied second order pulse trains $H'_1$–$H'_4$. Finally, the group of separators $80_a$–$80$ are responsive to the set of second order pulse trains $H'_1$–$H'_4$ and to the set of first order timing signals to provide a series of eight first order pulse trains $I_1$–$I_8$.

It is to be noted that the illustrated embodiment of the invention is shown for demonstration purposes only. Accordingly, various alterations and modifications may be made to the illustrated embodiment without departing from the spirit and scope of the invention.

What is claimed is:

1. In an internal combustion engine system including a group of eight fuel injection units for applying fuel to the engine when energized in a given injection order during each engine cycle, the combination comprising: means responsive to the operation of the engine for generating a set of four timing signals each having periodic amplitude transitions successively spaced at intervals of one-half of an engine cycle within each of the timing signals and successively displaced at intervals of one-eighth of an engine cycle between each of the timing signals; means for combining the set of timing signals to provide a pair of timing signals each having periodic amplitude transitions successively spaced at intervals of one-quarter of an engine cycle within each of the timing signals and successively displaced at intervals of one-eighth of an engine cycle between each of the timing signals; means for combining the pair of timing signals to provide a single timing signal having periodic amplitude transitions successively spaced at intervals of one-eighth of an engine cycle within the timing signal; means responsive to the single timing signal for generating a single pulse train having control pulses successively initiated at intervals of one-eighth of an engine cycle, the means connected with the engine for defining the duration of each of the control pulses in the single pulse train as a function of at least one engine operating parameter up to a maximum duration of approximately one-eighth of an engine cycle; means responsive to the single timing signal for separating the single pulse train to provide a pair of pulse trains each having control pulses successively initiated at intervals of one-quarter of an engine cycle within each of the pulse trains and successively displaced at intervals of one-eighth of an engine cycle between each of the pulse trains; means responsive to the pair of timing signals for separating the pair of pulse trains to provide a set of four pulse trains each having control pulses successively initiated at intervals of one-half of an engine cycle within each of the pulse trains and successively displaced at intervals of one-eighth of an engine cycle between each of the pulse trains; means responsive to the set of pulse trains for extending the duration of the control pulses within the set of pulse trains by a maximum factor of four so that each of the control pulses has a maximum duration of approximately one-half of an engine cycle; means responsive to the set of timing signals for separating the set of pulse trains to provide a series of eight pulse trains each having control pulses successively initiated at intervals of one engine cycle within each of the pulse trains and successively displaced at intervals of one-eighth of an engine cycle between each of the pulse trains; and means for individually applying the series of pulse trains to corresponding ones of the group of fuel injection units in the injection order to energize the fuel injection units for the duration of the control pulses in the pulse trains.

2. In an internal combustion engine system including a group of eight fuel injection units for applying fuel to the engine when energized in a given injection order during each engine cycle, the combination comprising: means responsive to the operation of the operation for generating a set of four bilevel timing signals each containing two alternate level transitions per engine cycle; means responsive to the set of bilevel timing signals for generating a pair of bilevel timing signals equal to the respective OR functions of the respective AND functions of alternate ones of the set of timing signals and the respective AND functions of alternate ones of the inverse of the set of timing signals so that the pair of bilevel timing signals each contain four alternate level transitions per engine cycle; means responsive to the pair of bilevel timing signals for generating a single bilevel timing signal equal to the OR function of the AND function of the pair of timing signals and the AND function of the inverse of the pair of timing signals so that the single bilevel timing signal contains eight alternate level transitions per engine cycle; means responsive to the single bilevel timing signal for generating a single bilevel pulse train containing eight control pulses per engine cycle each initiated in response to a different one of the eight alternate level transitions per engine cycle in the single pulse train, the means connected with the engine for defining the duration of each of the control pulses in the single pulse trains as a function of at least one engine operating parameter; means responsive to the single bilevel timing signal and the single bilevel pulse train for generating a pair of bilevel pulse trains equal to the respective AND functions of the single pulse train with the single timing signal and the inverse of the single timing signal so that the pair of bilevel pulse trains each contain four control pulses per engine cycle; means responsive to the pair of bilevel timing signals and the pair of bilevel pulse trains for generating a set of four bilevel pulse trains equal to the respective AND functions of the pair of pulse trains with the pair of timing signals and the inverse of the pair of timing signals so that the set of bilevel pulse trains each contain two control pulses per engine cycle; means responsive to the set of bilevel pulse trains for extending the duration of each of the control pulses so that the control pulses in each of the pulse trains overlap the control pulses in at least one other of the pulse trains; means responsive to the set of bilevel timing signals and the set of bilevel pulse trains for generating a series of eight bilevel pulse trains equal to the respective AND functions of the set of pulse trains with the set of timing signals and with the inverse of the set of timing signals so that the series of bilevel pulse trains each contain one control pulse per engine cycle; and means for applying the first through eighth of the series of pulse trains to the first through eighth of the group of fuel injection units according to the injection order to energize the fuel injection units for the duration of the control pulses in the pulse trains.

3. In an internal combustion engine system including a group of eight fuel injection units for applying fuel to the engine when energized in a given injection order per engine cycle, the combination comprising: means responsive to the operation of the engine to provide a set of four timing signals each containing two injection start permutations per engine cycle for a different corresponding two of the fuel injection units; means responsive to the set of timing signals to provide a pair of timing signals each containing injection start permutations in response to the injection start permutations in alternate ones of the set of timing signals so that each of the pair of timing signals contains four injection start permutations per engine cycle for a different corresponding four of the fuel injection units; means responsive to the pair of timing signals to provide a single timing signal containing injection start permutations in response to the injection start permutations in each of the pair of timing signals so that the single timing signal contains eight injection start permutations per engine cycle for the corresponding eight fuel injection units; means responsive to the single timing signal to provide a single pulse train containing injection period pulses in response to the injection start permutations in the single timing signal so that the single pulse train contains eight injection period pulses per engine cycle for the corresponding eight fuel injection units, the means connected to the engine for defining the duration of each of the injection period pulses in the single pulse train as a function of at least one engine operating parameter; means responsive to the single timing signal and to the single pulse train to provide a pair of pulse trains each containing injection period pulses from the single pulse train which are initiated in coincidence with alternate ones of the injection start permutations in the single timing signal so that each of the pair of pulse trains contains four injection period pulses per engine cycle for a different corresponding four of the fuel injection units; means responsive to the pair of timing signals and to the pair of pulse trains to provide a set of four pulse trains each containing injection period pulses from successive ones of the pair of pulse trains which are initiated in coincidence with alternate ones of the injection start permutations in successive ones of the pair of timing signals so that each of the set of pulse trains contains two injection period pulses per engine cycle for a different corresponding two of the fuel injection units; means responsive to the set of pulse trains to extend the duration of the injection period pulses in the set of pulse trains by a predetermined factor; means responsive to the set of timing signals and to the set of pulse trains to provide a series of eight pulse trains each containing injection period pulses from successive ones of the set of pulse trains which are initiated in coincidence with alternate ones of the injection start permutations in successive ones of the set timing signals so that each of the series of pulse trains contains one injection period pulse per engine cycle for a different corresponding one of the fuel injection units; and means for applying the series of pulse trains to corresponding ones of the group of fuel injection units to energize the fuel injection units for the duration of the injection period pulses in the pulse trains.

4. In an internal combustion engine system including a group of eight fuel injection units for applying fuel to the engine when energized in a given injection order during each engine cycle of 360°, the combination comprising: means responsive to operation of the engine for generating a set of four bilevel timing signals each having alternate level transitions spaced at intervals of 180° within each of the timing signals and displaced at intervals of 45° between each of the timing signals; means responsive to the set of bilevel timing signals for generating a pair of bilevel timing signals each having alternate level transitions spaced at intervals of 90° within each of the timing signals and displaced at intervals of 45° between each of the timing signals, the first of the pair of timing signals equal to the OR function of the AND function of the first and third of the set of timing signals and the AND function of the inverse of the first and third of the set of timing signals, and the second of the pair of timing signals equal to the OR function of the AND function of the second and fourth of the set of timing signals and the AND function of the inverse of the second and fourth of the set of timing signals; means responsive to the pair of bilevel timing signals for generating a single bilevel timing signal having alternate level transitions spaced at intervals of 45° within the timing signal, the single timing signal equal to the OR function of the AND function of the first and second of the pair of timing signals and the AND function of the inverse of the first and second of the pair of timing signals; means responsive to the single bilevel timing signal for generating a single pulse train including control pulses initiated at intervals of 45° in response to each of the alternate level transitions in the single timing signal, the means connected to the engine for defining the duration of the control pulses in the single pulse signal as a function of at least one engine operating parameter up to a maximum duration of approximately 45°; means responsive to the single bilevel timing signal and the single bilevel pulse train for generating a pair of bilevel pulse trains each including control pulses initiated at intervals of 90° within each of the pulse trains and displaced at intervals of 45° between each of the pulse trains, the pair of pulse trains equal respectively to the individual AND functions of the single pulse trains with the single timing signal and with the inverse of the single timing signal; means responsive to the pair of bilevel timing signals and the pair of bilevel pulse trains for generating a set of four bilevel pulse trains each including control pulses initiated at intervals of 180° within each of the pulse trains and displaced at intervals of 45° between each of the pulse trains, the set of pulse trains equal respectively to the individual AND functions of the pair of pulse trains with the pair of timing signals and with the inverse of the pair of timing signals; means responsive to the set of pulse trains for extending the duration of the control pulses within the set of pulse trains by a maximum factor of four so that each of the control pulses has a maximum duration of approximately 180°; means responsive to the set of timing signals and to the set of bilevel pulse trains for generating a series of eight bilevel pulse trains each including control pulses initiated at intervals of 360° within each of the pulse trains and displaced at intervals of 45° between each of the pulse trains, the series of pulse trains equal respectively to the individual AND functions of the set of pulse trains with the set of timing signals and with the inverse of the set of timing signals; and means for applying the first through eighth of the series of pulse trains to the first through eighth of the group of fuel injection units according to the injection order to energize the fuel injection units for the duration of each of the control pulses in the pulse trains.

5. In an internal combustion engine system including a group of eight fuel injection units for applying fuel to the engine when energized in a given injection order per engine cycle, the combination comprising: means responsive to the operation of the engine to provide a set of four timing signals each containing two magnitude permutations per engine cycle; means responsive to the set of timing signals to provide a pair of timing signals each containing four magnitude permutations per engine cycle, the first of the pair of timing signals containing magnitude permutations in response to the magnitude permutations in the first and third of the set of timing signals, and the second of the pair of timing signals containing magnitude permutations in response to the magnitude permutations in the second and fourth of the set of timing signals; means responsive to the pair of timing signals to provide a single timing signal containing eight magnitude permutations per engine cycle, the single timing signal containing magnitude permutations in response to each of the magnitude permutations in the first and second of the pair of timing signals; means responsive to the single timing signal to provide a single pulse train containing eight control pulses per engine cycle in response to the eight magnitude permutations in the single timing signal per engine cycle, the means connected to the engine for defining the duration of each of the control pulses in the single pulse train as a function of at least one engine operating parameter; means responsive to the single timing signal and to the single pulse train to provide a pair of pulse trains each containing four control pulses per engine cycle, the first and second of the pair of pulse trains containing control pulses from the single pulse train which are initiated in coincidence with alternate ones of the magnitude permutations in the single timing signal, respectively; means responsive to the pair of timing signals and to the pair of pulse trains to provide a set of four pulse trains each containing two control pulses per engine cycle, the first and third of the set of pulse trains containing control pulses from the first of the pair of pulse trains which are initiated in coincidence with alternate ones of the magnitude permutations in the first of the pair of timing signals, and the second and fourth of the set of pulse trains containing control pulses from the second of the pair of pulse trains which are initiated in coincidence with alternate ones of the magnitude permutations in the second of the pair of timing signals; means responsive to the set of pulse trains to extend the duration of the control pulses in the set of pulse trains by a predetermined factor; means responsive to the set of timing signals and to the set of pulse trains to provide a series of eight pulse trains each containing one control pulse per engine cycle, the first and fifth of the series of pulse trains containing control pulses from the first of the set of pulse trains which are initiated in coincidence with alternate magnitude permutations in the first of the set of timing signals, respectively, the second and sixth of the series of pulse trains containing control pulses from the second of the set of pulse trains which are initiated in coincidence with alternate magnitude permutations in the second of the set of timing signals, respectively, the third and seventh of the series of pulse trains containing control pulses from the third of the set of pulse trains which are initiated in coincidence with alternate magnitude permutations in the third of the set of timing signals, respectively, and the fourth and eighth of the series of pulse trains containing control pulses from the fourth of the set of pulse trains which are initiated in coincidence with alternate magnitude permutations in the fourth of the set of timing signals, respectively; and means for applying the first through eighth of the series of pulse trains to the first through eighth of the group of fuel injection units according to the injection order to individually energize the fuel injection units for the duration of the control pulses in the pulse trains.

6. In an internal combustion engine system including eight fuel injection units for applying fuel to the engine when energized in a given injection order during each engine cycle of 360°, the combination comprising: means responsive to the operation of the engine for generating four first order timing signals each exhibiting two magnitude transitions of alternate first and second sense during each engine cycle, the first of the first order timing signals having a first sense transition at the 0° point and a second sense transition at the 180° point of each engine cycle, the second of the first order timing signals having a first sense transition at the 45° point and a second sense transition at the 225° point of each engine cycle, the third of the first order timing signals having a first sense transition at the 90° point and a second sense transition at the 270° point of each engine cycle, and the fourth of the first order timing signals having a first sense transition at the 135° point and a second sense transition at the 315° point in each engine cycle; means responsive to the four first order timing signals for generating two second order timing signals each exhibiting four magnitude transitions of alternate first and second sense during each engine cycle, the first of the second order timing signals having a first sense transition in response to each of the magnitude transitions in the first of the first order timing signals and having a second sense transition in response to each of the magnitude transitions in the third of the first order timing signals, and the second of the second order timing signals having a first sense transition in response to each of the magnitude transitions in the second of the first order timing signals and having a second sense transition in response to each of the magnitude transitions in the fourth of the first order timing signals; means responsive to the two second order timing signals for generating one third order timing signal exhibiting eight magnitude transitions of alternate first and second sense during each engine cycle, the third order timing signal having a first sense transition in response to each of the magnitude transitions in the first of the second order timing signals and having a second sense transition in response to each of the magnitude transitions in the second of the second order timing signal; means responsive to the third order timing signal for generating one fourth order pulse train having eight control pulses during each engine cycle in response to the eight magnitude transitions in the third order timing signal during each engine cycle, the means connected to the engine for defining the duration of each of the control pulses in the fourth order pulse train as a function of at least one engine operating parameter up to a maximum duration of 45°; means responsive to the third order timing signal and the fourth order pulse train for generating two third order pulse trains each having four control pulses during each engine cycle, the first and second of the third order pulse trains containing control pulses from the fourth order pulse train which are initiated in coincidence with the first sense transitions and with the second sense transitions, respectively, in the third order timing signal; means responsive to the two second order timing signals and to the two third order pulse trains for generating four second order pulse trains each having two control pulses during each engine cycle, the first and third of the second order pulse trains containing control pulses from the first of the third order pulse trains which are initiated in coincidence with the first sense transitions and with the second sense transitions, respectively, in the first of the second order timing signals, and the second and fourth of the second order pulse trains containing control pulses from the second of the third order pulse trains which are initiated in coincidence with the first sense transitions and with the second sense transitions, respectively, in the second of the second order timing signals; means responsive to the four second order pulse trains for extending the duration of the control pulses by a factor of four (4) so that each of the control pulses has a maximum duration of 180°; means responsive to the four first order timing signals and the four second order pulse trains for generating eight first order pulse trains each having one control pulse during each engine cycle, the first and fifth of the first order pulse trains containing control pulses from the first of the second order pulse trains which are initiated in coincidence with the first sense transitions and with the second sense transitions, respectively, in the first of the first order timing signals, the third and seventh of the first order pulse trains containing control pulses from the third of the second order pulse trains which are initiated in coincidence with the first sense transitions and with the second sense transitions, respectively, in the third of the first order timing signals, the second and sixth of the first order pulse trains containing control pulses from the second of the second order pulse trains which are initiated in coincidence with the first sense transitions and with the second sense transitions, respectively, in the second of the first order timing signals, and the fourth and eighth of the first order pulse trains containing control pulses from the fourth of the second order pulse trains which are initiated in coincidence with the first sense transitions and with the second sense transitions, respectively, in the fourth of the first order timing signals; and means for applying the first through eighth of the first order pulse trains to the first through eighth of the fuel injection units according to the injection order to energize the fuel injection units for the duration of the control pulses.

\* \* \* \* \*